Aug. 7, 1945.     A. J. BASTIAN     2,381,249
BEARING ASSEMBLY
Filed Dec. 7, 1943
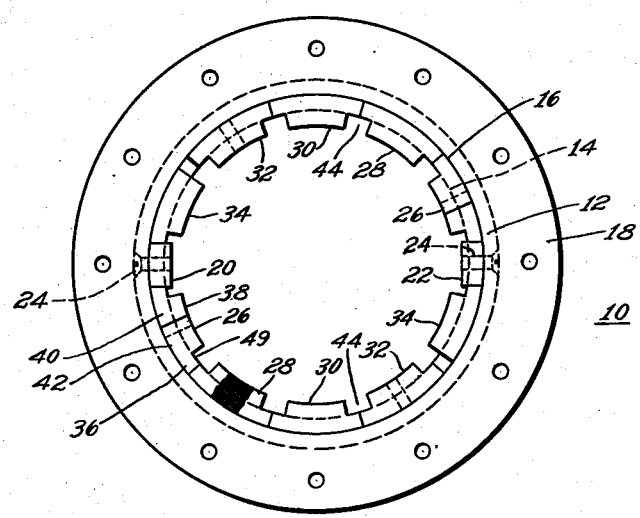
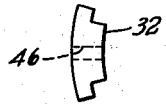 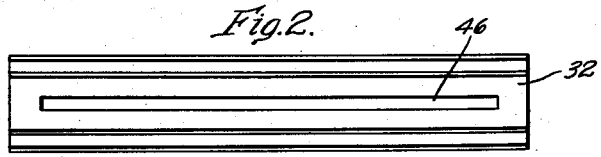
 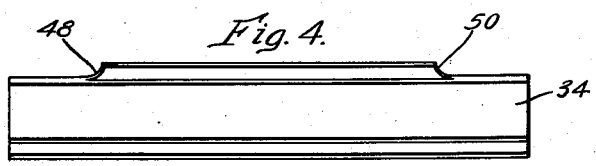
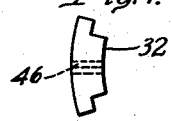 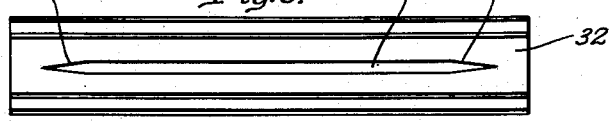
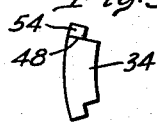 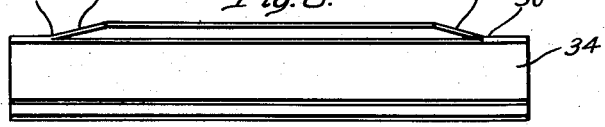
WITNESSES:
INVENTOR
Arthur J. Bastian.
BY
ATTORNEY Patented Aug. 7, 1945

2,381,249

UNITED STATES PATENT OFFICE 2,381,249

BEARING ASSEMBLY

Arthur J. Bastian, East Orange, N. J., assignor to Westinghouse Electric Corporation, East Pittsburgh, Pa., a corporation of Pennsylvania Application December 7, 1943, Serial No. 513,291

6 Claims. (Cl. 308—238)

This invention relates generally to bearings and, more particularly, to composition bearing assemblies.

Heretofore composition bearing assemblies have been employed extensively in the marine industry. However, trouble has been encountered in such service for the composition bearings swell and become distorted when immersed in lubricating liquids.

Since the bearing assembly is usually formed of staves retained in a housing, the swelling of the composition staves usually forces the staves to buckle inwardly, forces as high as 19,500 pounds per square inch having been measured between the staves. In my Patent No. 2,310,053, there is disclosed and claimed a bearing assembly which utilized a stave having a slot in the base thereof to compensate for peripheral swelling. In practice it was found that the stave described in the aforementioned patent compensates for swelling if the bearing is placed in service immediately. However, where the bearing is assembled on new craft which remains in the fitting dock for a prolonged period of time, the bearing is not self-compensating for swelling, but instead the slotted staves buckle inwardly to seize the shaft carried by the bearing, the stave having the slot therein often splitting at the bearing surface in the region of the slot. Since most bearings are assembled in operative position on a craft while in dry or fitting dock, it is apparent that even the improved bearing assembly described in my aforementioned patent is not always satisfactory for compensating for swelling.

An object of this invention is to compensate for the expansion and swelling of a bearing of molded composition under predetermined operating conditions.

Another object of this invention is to provide a bearing assembly having staves of molded composition so formed as to compensate for swelling when immersed in liquids.

Other objects of this invention will become apparent from the following description when taken in conjunction with the accompanying drawing, in which:

Figure 1 is a view in elevation and partly in section of a bearing assembly embodying the teachings of this invention;

Fig. 2 is a top plan view of one of the staves utilized in the bearing assembly of Fig. 1;

Fig. 3 is an end view of the stave of Fig. 2;

Fig. 4 is a top plan view of another of the staves utilized in the bearing assembly of Fig. 1;

Fig. 5 is an end view of the stave shown in Fig. 4;

Fig. 6 is a top plan view of a stave utilized in another embodiment of this invention;

Fig. 7 is an end view of the stave shown in Fig. 6;

Fig. 8 is a top plan view of a stave utilized in conjunction with the stave of Fig. 6 in accordance with the teachings of this invention; and Fig. 9 is an end view of the stave shown in Fig. 8.

Referring to the drawings, this invention is illustrated by reference to a bearing assembly 10. As illustrated, a housing or bushing 12 of bronze or any other suitable material is utilized for supporting the bearing material, the housing having a flange 14 at one end thereof to assist in maintaining the bearing material in position in the bore 16 of the housing and a flange 18 at the other end to facilitate the mounting of the assembly.

In the embodiment illustrated, the bore 16 of the housing is machined smooth and a pair of keeper strips 20 and 22 are disposed to seat diametrically opposite one another on the smooth surface of the bore 16. The keeper strips 20 and 22 may be of any suitable strong material, being secured in position by means of the screws 24 which project through the housing or bushing 12 into the keeper strip. The keeper strips 20 and 22 preferably extend from one end of the bushing to the other and may be formed of either a single long strip or a plurality of short strips (not shown) laid longitudinally endwise in aligned relation and retained in position by means of the screws 24.

In order to provide a suitable bearing surface for a shaft (not shown), a group of relatively long staves is seated on the smooth bore 16 between the keeper strips 20 and 22 on each half of the bore. In the embodiment illustrated in Fig. 1, each group comprises five staves 26, 28, 30, 32 and 34 on each half of the bore. For purposes of balance, the corresponding staves of each group are preferably disposed diametrically opposite one another.

Each of the staves, and in some cases the keeper strips, is formed of laminated fibrous material, such as duck or other cloth fabrics impregnated with a resinous binder, such as phenolic or urea resin or other resinous mixtures consolidated under heat and pressure into a strong body. Such fibrous materials impregnated with a heat-hardening resinoid are well known in the art and need not be further described herein, it being apparent that the choice of the fibrous material and the resinous binder utilized therewith depends upon the characteristics which it is required to develop in the bearing material. After having been consolidated, the formed laminated body is machined to the predetermined and required shape of the stave or keeper strip, the staves being so machined, however, that the laminations of the fibrous material extend substantially perpendicularly to the base of the stave to present edges in the bearing surface, as illustrated by stave 28 in Fig. 1.

Each of the staves of laminated material is machined to have a base portion 36, the curvature of the base portion being the same as the curvature of the smooth bore 16 as illustrated. Each of the staves is also machined to have a curved bearing surface 38 for receiving the shaft (not shown), the machining of the bearing surface usually being accomplished after the staves are assembled in operative position in the housing. As illustrated, stave 26 of each of the groups is formed of two complementary tapered sections 40 and 42, this stave functioning in a well known manner to wedge the other staves in an operative position with respect to the keeper strips 20 and 22.

The staves of each group are preferably cut away along their edges adjacent the bearing surface, whereby adjacent bases of the staves cooperate to form grooves 44 when the staves are assembled in operative position. The grooves 44 function as lubricating grooves, being of a depth sufficient to provide proper lubrication for the bearing surfaces.

The staves 32 and 34 of each of the groups are of special construction for compensating for swelling of the staves when immersed in a lubricating liquid. Referring to Figs. 2, 3, 4 and 5, staves 32 and 34 are more clearly illustrated.

The stave 32 is machined to shape in the same manner as the other staves having the edges machined for cooperating with adjacent staves for forming the water grooves 44. However, stave 32 distinguishes from stave 30 in that a slot 46 is machined through the stave 32 intermediate the ends and sides of the stave. The cutout section or slot 46 extends lengthwise of the stave for substantially the entire distance of the stave, the width of the slot 46 depending upon the amount of swelling which is to be encountered.

The stave 34 illustrated in Figs. 4 and 5 is also similar to stave 30, with the exception that the edge of the stave 34 which is to seat against the stave 32 is machined adjacent each end to provide cutout sections 48 and 50 adjacent the ends of the stave. The width of the cutout sections 48 and 50 is substantially equal to the width of the slot 46 formed in the cooperating stave 32, each of the cutout sections extending lengthwise of the stave 34 a distance ranging from slightly longer to three times the length of the unslotted ends of the stave 32. Thus, when the stave 34 is positioned adjacent the stave 32, the cutout sections 48 and 50 of stave 34 are offset relative to the cutout section or slot 46 in the stave 32, the ends of the cutout sections 48 and 50, however, being in an overlapping relation with the ends of the cutout section or slot 46.

Instead of the staves 32 and 34 illustrated in Figs. 2 and 4, the staves 32 and 34 illustrated in Figs. 6, 7, 8 and 9 may be employed with equally good results. The staves illustrated in Figs. 6 through 9 are formed in the same manner as those illustrated in Figs. 2 and 4, the only distinction being that the ends of the cutout section or slot 46 and the inner ends of the cutout sections 48 and 50 are tapered as at 52, 54 and 56, respectively. By utilizing the staves illustrated in Figs. 6 and 8, it is found that the slot 46 and the cutout sections 48 and 50 are more completely filled under operating conditions when the staves are distorted as described hereinafter.

With either embodiment of the specially constructed staves described hereinbefore in the assembly shown in Fig. 1, it is found that, when the bushing is immersed, the staves 32 and 34 in each half of the assembly cooperate to permit distortion of the staves to compensate for the swelling without an accompanying detrimental distortion of the internal bearing surface. In the assembly having the staves 32 and 34 with the slots and cutout sections in offset relation as described, it is found in practice that all of the staves in the assembly swell when immersed in the liquid and move somewhat around the inside of the bushing 12, the staves 32 and 34 becoming so distorted as to compensate for such movement. Under such conditions, the staves swell and the resulting pressure forces the cutout section or slot 46 to become substantially filled, the ends of the stave 34 becoming so distorted as to substantially fill the cutout sections 48 and 50, the machined ends of the adjacent edge of the stave 34 seating against the edge of the stave 32. The pair of staves 32 and 34 in the assembly thus cooperate to permit swelling of the stave assembly without seizure of the shaft (not shown).

In producing the bearing assembly, the width of the slot 46 in the staves 32 is determined by the amount of peripheral swelling encountered in a similar bearing assembly which does not utilize the slotted staves of this invention. For example, in a small bearing where the periphery of one-half of the bearing is 6 inches, the expansion of the staves is found to be approximately 0.120 inch. Since the staves of the assembly shown in Fig. 1 must be tight in the housing in use, the slot 46 of stave 32 is somewhat less than 0.120 inch, so that after the distortion of the staves, the slot will be filled and the staves tight.

Where the expansion is quite large as in larger bearing assemblies, it is preferred to utilize more than one set of the staves 32—34 in each half of the assembly so that the width of the slot 46 is not over about $\frac{3}{32}$ of an inch. Further the cutout sections or slots 46 preferably start at not less than 3 inches from the ends of the staves 32, the cutout sections 48 and 50 of the cooperating staves 34 overlapping the unslotted ends of staves 32 by from 1 to 3 inches.

The swelling and distortion of the staves 32 and 34 are sufficient to relieve the pressure between the staves of each of the groups, thereby overcoming the tendency of the other staves to buckle inwardly and seize the shaft (not shown). These special staves afford adequate compensation for peripheral expansion of the fibrous material of the assembled staves to give a substantially uniform swelling pattern. By maintaining the substantially uniform swelling pattern, a continuous field of lubricating medium can be maintained over the internal bearing surface to give longer life to the bearing and the shaft operated therein.

Different modifications and arrangements of the keeper strips and the specially constructed staves are possible, and, in fact, are necessitated by the size of the bearing assembly and are, therefore, clearly contemplated within the scope of this invention. For example, where the periphery of the bearing assembly is quite large, it will be necessary to employ more of the specially constructed staves in order to provide adequate compensation for the swelling of the bearing material. Likewise, the number of staves of each group and the shape and size of the lubricating grooves may be varied somewhat depending upon the size of the bearing required.

While this invention has been described with reference to a particular embodiment thereof, it is, of course, not to be limited thereto except in so far as is necessitated by the scope of the appended claims.

I claim as my invention:

1. In a bearing, in combination, a housing, a keeper strip carried by the housing, a plurality of staves for lining the housing to provide bearing surfaces, each of the staves comprising a strong body consolidated from laminated fibrous material impregnated with heat-hardening resinoid, certain of the staves having cutout sections of substantially equal width over at least a major part of the length of the sections disposed lengthwise of the staves in an offset relation, the offset cutout sections being in overlapping relation in the lengthwise direction of the staves whereby the cutout sections cooperate to permit distortion of the staves to compensate for swelling.

2. In a bearing, in combination, a housing, a keeper strip carried by the housing, a plurality of staves for lining the housing to provide bearing surfaces, each of the staves comprising a strong body consolidated from laminated fibrous material impregnated with heat-hardening resinoid, a pair of adjacent staves having cutout sections of substantially equal width over at least a major part of the length of the sections disposed lengthwise of the staves in an offset relation, the offset cutout sections of the adjacent staves being in overlapping relation in the lengthwise direction of the staves whereby the cutout sections cooperate to permit distortion of the staves to compensate for swelling.

3. In a bearing, in combination, a housing, a keeper strip carried by the housing, a plurality of staves for lining the housing to provide bearing surfaces, each of the staves comprising a strong body consolidated from laminated fibrous material impregnated with heat-hardening resinoid, certain of the staves having cutout sections of substantially equal width disposed lengthwise of the staves in an offset relation, the offset cutout sections being in overlapping relation in the lengthwise direction of the staves with the ends of the cutout sections in overlapping relation being tapered, the cutout sections cooperating to permit distortion of the staves to compensate for swelling.

4. In a bearing, in combination, a housing, a keeper strip carried by the housing, a plurality of staves for lining the housing to provide bearing surfaces, each of the staves comprising a strong body consolidated from laminated fibrous material impregnated with heat-hardening resinoid, at least one of the staves having a slot therein extending therethrough intermediate the ends and sides of the stave, a stave adjacent the slotted stave having cutout sections along the edge thereof at the ends of the stave, the cutout sections and the slot of the adjacent staves being of substantially equal width over at least a major part of the length of the sections but overlapping in the lengthwise direction of the staves whereby the slot and the cutout sections cooperate to permit distortion of the staves to compensate for swelling.

5. In a bearing, in combination, a housing, a keeper strip carried by the housing, a plurality of staves for lining the housing to provide bearing surfaces, each of the staves comprising a strong body consolidated from laminated fibrous material impregnated with heat-hardening resinoid, at least one of the staves having a slot therein extending therethrough intermediate the ends and sides of the stave, a stave adjacent the slotted stave having cutout sections along the edge thereof at the ends of the stave, the cutout sections and the slot of the adjacent staves being of substantially equal width disposed lengthwise of the staves, the slot being longer than the cutout sections at the ends of the adjacent stave with the ends of the slot and cutout sections disposed in overlapping relation whereby the slot and the cutout sections cooperate to permit distortion of the staves to compensate for swelling.

6. In a bearing, in combination, a housing, a keeper strip carried by the housing, a plurality of staves for lining the housing to provide bearing surfaces, each of the staves comprising a strong body consolidated from laminated fibrous material impregnated with heat-hardening resinoid, at least one of the staves having a slot therein extending therethrough intermediate the ends and sides of the stave, a stave adjacent the slotted stave having cutout sections along the edge thereof at the ends of the stave, the cutout sections and the slot of the adjacent staves being of substantially equal width disposed lengthwise of the staves in overlapping relation, the slot being longer than the cutout sections at the ends of the adjacent stave with the ends of the slot and cutout sections being tapered, the cutout sections and slot in the adjacent staves cooperating to permit distortion of the staves to compensate for swelling.

ARTHUR J. BASTIAN.